(12) United States Patent
Spano

(10) Patent No.: US 9,950,648 B2
(45) Date of Patent: Apr. 24, 2018

(54) UNIVERSAL QUICK CONNECT CAR-SEAT RESTRAINT SYSTEM

(71) Applicant: Michael J. Spano, New York, NY (US)

(72) Inventor: Michael J. Spano, New York, NY (US)

( * ) Notice: Subject to any disclaimer, the term of this patent is extended or adjusted under 35 U.S.C. 154(b) by 0 days.

(21) Appl. No.: 14/969,334

(22) Filed: Dec. 15, 2015

(65) Prior Publication Data

US 2017/0341540 A1 Nov. 30, 2017

(51) Int. Cl.
*A47C 1/12* (2006.01)
*B60N 2/28* (2006.01)
*B62B 7/14* (2006.01)
*A47D 15/00* (2006.01)
*B62B 9/10* (2006.01)

(52) U.S. Cl.
CPC ......... *B60N 2/2812* (2013.01); *A47D 15/006* (2013.01); *B60N 2/286* (2013.01); *B62B 7/145* (2013.01); *B62B 9/102* (2013.01)

(58) Field of Classification Search
CPC .... B60N 2/2812; B60N 2/286; A47D 15/006; A62B 7/145
USPC ...................... 297/465, 464, 467, 484, 250.1
See application file for complete search history.

(56) References Cited

U.S. PATENT DOCUMENTS

| | | | | |
|---|---|---|---|---|
| 5,301,371 A | * | 4/1994 | Chao | A41D 13/0007 2/102 |
| 6,254,184 B1 | | 7/2001 | Kontos | |
| 8,434,827 B2 | * | 5/2013 | Young | A47D 15/006 297/250.1 |
| 2005/0179244 A1 | * | 8/2005 | Schroth | B60R 22/14 280/808 |
| 2008/0211278 A1 | * | 9/2008 | Macliver | B60N 2/2812 297/250.1 |
| 2011/0283446 A1 | * | 11/2011 | Baldauf | A41D 13/0007 2/462 |
| 2012/0042433 A1 | * | 2/2012 | Damon | A44B 19/38 2/69 |

* cited by examiner

*Primary Examiner* — Syed A Islam
(74) *Attorney, Agent, or Firm* — F. Rhett Brockington

(57) ABSTRACT

The invention is a quick connect car-seat/stroller restraint system that includes a torso clothing element with a fastening means that is loosely holding a pair of adjustable sectional restraint elements made of a restraint strap, and having tensioning elements. One tensioning element is an opposing upper horizontal pair of connectors that pull the restraint strap toward a frontal centerline. A second tensioning element is a set of lap tensioning elements that connect to a lap twin slotted buckle. A third tensioning element is a plurality of quick connecting tensioning elements. Each of the pair of the adjustable sectional restraint elements has two end portions, and each end portion has a quick connecting, fastening element that can be fastened to a receiving tensioning g element in a car-seat/stroller. When connected the sectional restraint elements are slightly tensioned, limiting the movement of an individual wearing the torso clothing element.

18 Claims, 4 Drawing Sheets

UNIVERSAL QUICK CONNECT CAR-SEAT RESTRAINT SYSTEM

BACKGROUND OF THE INVENTION

1. Field of the Invention

The present invention relates generally to a car seat system, and more particularly to a restraining means for securing a child to a child's car seat, wherein the invention includes a universal apparatus that enables a child to be quickly fastened into a child's car seat or the child to be quickly fastened into a stroller, where the stroller need not be equipped to receive an infant car seat.

2. Prior Art

In the some of the initial child car seats devised to restrain an infant in a vehicle, the seats have rigid barriers in front of the child along with the use of harness or restraining straps, as disclosed in U.S. Pat. No. 5,664,833 issued Sep. 9, 1997 to Celestina-Krevh et al. Other child car seats have a harness or restraining straps as disclosed in U.S. Pat. No. 5,125,965 issued Jun. 16, 1992 to Skold et al.

Another example of a harness or restraint system is shown in U.S. Pat. No. 3,321,247 issued May 23, 1967 to Dillender, wherein a harness system is used to strap a child to a regular automobile car seat, precluding movement without involving a specialized child car seat. Ensign discloses in U.S. Pat. No. 4,674,800 issued Jun. 23, 1987 a harness-like vestment to envelop the child in multiple cocoon-like surroundings in a regular car seat, also precluding movement without involving a specialized child car seat.

Kontos discloses a harness/restraint system in his U.S. Pat. No. 6,254,184 that issued on Jul. 3, 2001. The system has a bib-like member having a pair of neck straps that extend through the back of the back of the car seat, and additionally five perimeter straps that attach to the left edge (1 upper, 1 lower), the right edge (1 upper, 1 lower), and a lower edge (1 center bottom) of the bib-like member. The five straps are connected to the edges, and provide distributed support to the region below the neckline of the bib-like member. In total there are seven connections. The pair of neck straps supports the neckline and shoulders. The side straps must be kept fairly tight, otherwise the child could slip down until the child's neck comes into contact with the bib member's neckline, and this could be a choking hazard during an accident. The bib-like member must be constructed of a strong material as it functions as the forward restraint in a collision.

In newer car seats for infants, a rearward facing car seat is portable, and an infant can be hand carried in the portable car seat. In some variations the portable car seat can be latched onto a car seat base, or alternatively latched onto a stroller or carriage. The portable car seat system has a limited length of use, as the infant becomes too large to be easily carried and latched using the portable car seat.

SUMMARY OF THE INVENTION

The invention, in one aspect, is a quick connect car-seat restraint system, wherein the system is at least partially universally compatible with most existing child car seats and strollers or modified versions thereof.

A second aspect of the invention is that even before the seat restraint straps are tensioned, the child will be partially restrained by the system as soon as soon as attachment commences, which enables a caregiver to complete fastening the child into the car seat.

The system includes a torso clothing element having an upper body portion to which is affixed a fastening means for securing a pair of adjustable sectional restraint elements and at least three tensioning elements that are compatible with most car seats for children. The torso clothing element is selected from the group consisting of a jacket, a vest, a shirt, a blouse, a sweater, a mesh covering, a jumper, a onesie, a T-shirt, and a jump suit. The torso clothing element desirably has a relatively smooth frontal surface, therein precluding the entanglement of cloth with the adjustably affixed sectional elements and whole elements. The torso clothing element preferably has a center-line closure mechanism, such as a zipper, or is comprised of a material that is elastic enough that it can be pulled on. The torso clothing element can be either dry cleaned or washed.

The sectional restraint elements include a right sectional restraint element and a left sectional restraint element, differing mainly with respect to their right or left position relative to the medial center-line. The right sectional restraint element includes a sectional length of restraint strap having an upper end that is terminated with an upper right adjustable tensioning element. When not tensioned by the tensioning elements, the right sectional element loosely drapes over a right shoulder extending frontally and looping downward and outward terminating with a lower right adjustable tensioning element that is proximate to a lower right side edge of the clothing, element. The left sectional element has a similar length of restraint strap, wherein an upper left end is terminated with an upper left adjustable tensioning element. The left sectional element loosely drapes over a left shoulder extending frontally and looping downward and outward terminating in an end with a lower left adjustable tensioning element proximate to a lower left, side edge of the clothing element. The torso clothing element with affixed adjustable sectional restraint elements and the tensioning elements can be easily fitted onto the child when the tensioning elements is are not connected. After the child is dressed with the torso clothing element, it can be secured by fastening a chest tensioning element, which prevents the clothing from being pulled over their head or unzipped. Connecting the chest tensioning element partially limits the movement of the right and left sectional elements. The child is now partially prepared for being quickly connected to a car seat or stroller.

The fastening means can be loops or other fastening elements such as snaps, pockets, hook and loop (Velcro™) materials can be used to position the four adjustable tensioning elements on the torso clothing element so that they can be easily accessed, therein facilitating quick location and hooking up to receiving tensioning elements. An advantage of loops, similar to belt loops, is that the sectional restraint straps are not tensioned, as movement through the loops is unhindered, until one of the adjustable tensioning elements is in abutment with the loop.

In an exemplary variation, the torso clothing element is fitted with an upper right loop, a lower right loop, an upper left loop, a lower left loop. The upper right loop loosely holds the upper right adjustable tensioning element by an upper end portion of the right sectional strap, and the lower right loop loosely holds the lower right adjustable tensioning element by a lower end portion of the right sectional strap. On the left front side of the clothing element the upper left loop similarly restrains the upper left adjustable tensioning element by an upper end portion of left sectional strap, and the lower left loop loosely holds the lower left adjustable tensioning element by a lower end portion of left sectional strap.

Shoulder pads can be a part of the clothing element, or can be slideably mounted on the restraint straps.

When the child is positioned, seated in the child's car seat, the upper right loop affixed on the clothing element provides position alignment for the upper right adjustable tensioning element with an upper right receiving tensioning element that is projecting from an overhead right slot in the child's car seat, and a lower right loop on the lower right side edge of the clothing element provides position alignment of the lower right adjustable tensioning element with a lower right receiving tensioning element that is projecting from a bottom right side of the child's car seat. Connecting the upper right and the adjustable tensioning elements with the upper right and the lower right receiving tensioning elements generates some tension in the right sectional element, and it fastens the torso clothing element to the car seat therein generating a level of restraint. Likewise, attaching the upper left sectional to an upper left receiving tensioning element that is projecting from an overhead left slot in the child's car seat, and a lower left loop on the lower right side edge of the clothing element provides position alignment of the lower left adjustable tensioning element with a lower left receiving tensioning element that is projecting from a bottom left side of the child's car seat element generates additional restraint. The order of attachment is left up to the discretion of the caregiver. The child normally is wearing the universal apparatus before being fastened to the car seat or stroller, or the universal apparatus can be already be attached, and, the child can be zipped into the universal apparatus, and then the remaining tension elements can be connected.

The remaining tensioning elements include the chest tensioning element having an opposing upper horizontal pair of connectors that when connected tends to pull the left and right sectional lengths of restraint strap medially toward the centerline of the clothing element, tensioning the restraint straps. As previously stated the chest tensioning element is typically connected prior to hooking up the child in the car seat or stroller, as the chest tensioning element will prevent most children from removing their torso clothing element.

The remaining tensioning elements also include a pair of lap tensioning elements. The pair of lap tensioning elements includes a left angled connector and a right angled connector, which connect to a lap twin slotted buckle on an adjustable belt. The lap twin slotted buckle can be adjusted before or after being connected. When connected, the left angled connector and a right angled connector tension the left and right sectional lengths of restraint strap respectfully, pulling them medially toward the center-line and downward. The car seat's lap twin slotted buckle can also be loosened by feeding in the adjustable belt. A stroller has a similar lap twin slotted buckle.

An object of the invention is that the child can be moved out of the car seat to a stroller by disconnecting the pair of lap tensioning elements and the four adjustable tensioning elements; and reconnecting the pair of lap tensioning elements and the four adjustable tensioning elements to the stroller's four receiving tensioning element. Depending on the child, connection to a stroller's similar adjustable lap twin slotted buckle may not be needed, as the universal apparatus provides sufficient restraint.

The torso clothing element, the sectional restraint elements, and the loops or other fastening elements are selected to be properly sized for the child.

BRIEF DESCRIPTION OF THE DRAWINGS

The foregoing invention will become readily apparent by referring to the following detailed description and the appended drawings in which.

DETAILED DESCRIPTION OF THE INVENTION

Figure 1:
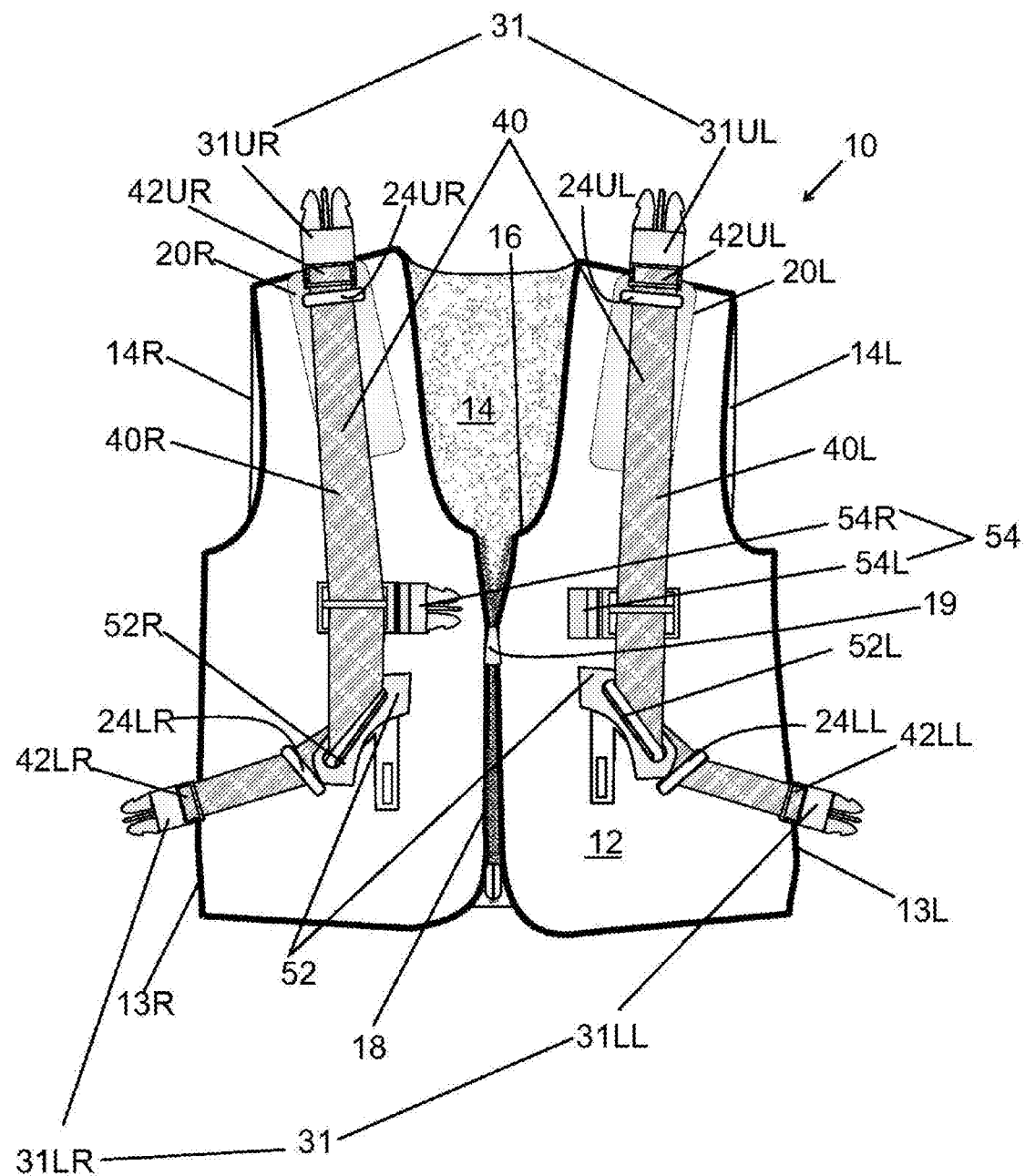
FIG. 1 is a frontal view of a universal quick connect car-seat restraint system, wherein a torso clothing item is partially unzipped, the sectional restraint elements affixed by loops and the tension elements are disconnected.

The invented system 10 as shown in FIG. 1, includes a torso clothing element 12 having an upper body portion with a fastening means for holding a pair of adjustable sectional restraint elements 40 (40R,40L) and at least three tensioning elements 31 (31UR,31LR, 31UL, 31LL), 52 (52R,52L) and 54 (54L,54R). The tensioning elements are compatible with most car sea is for children. The torso clothing element 12 that is illustrated is a jacket 14 that is sleeveless 14L,14R. The jacket 14 is selected from the group consisting of a jacket, a vest, a shirt, a blouse, a sweater, a mesh covering, a jumper, a onesie, a T-shirt, and a jump suit.

Note, not listed as a torso clothing item is a winter coat, especially one having puffy insulation or that is oversize. There are several problems associated with winter coats. They can be too hot in the car, they are difficult to remove, and they should not be worn under the invented universal apparatus. Winter coats having puffy insulation or that are oversize prevent the restraint straps from being properly snugged around the child's torso and properly aligned over the child's shoulders. Winter coats have been found to compromise the performance of child restraint systems in general.

As illustrated, the embodiment of the suitable torso clothing item is a vest or a sleeveless jacket 4, wherein the embodiment is generally snug fitting. If a winter coat is required, it is recommended that that the winter coat be slipped on backwards, on top of the universal apparatus 10, after the child is secured in the car seat.

Figure 2:
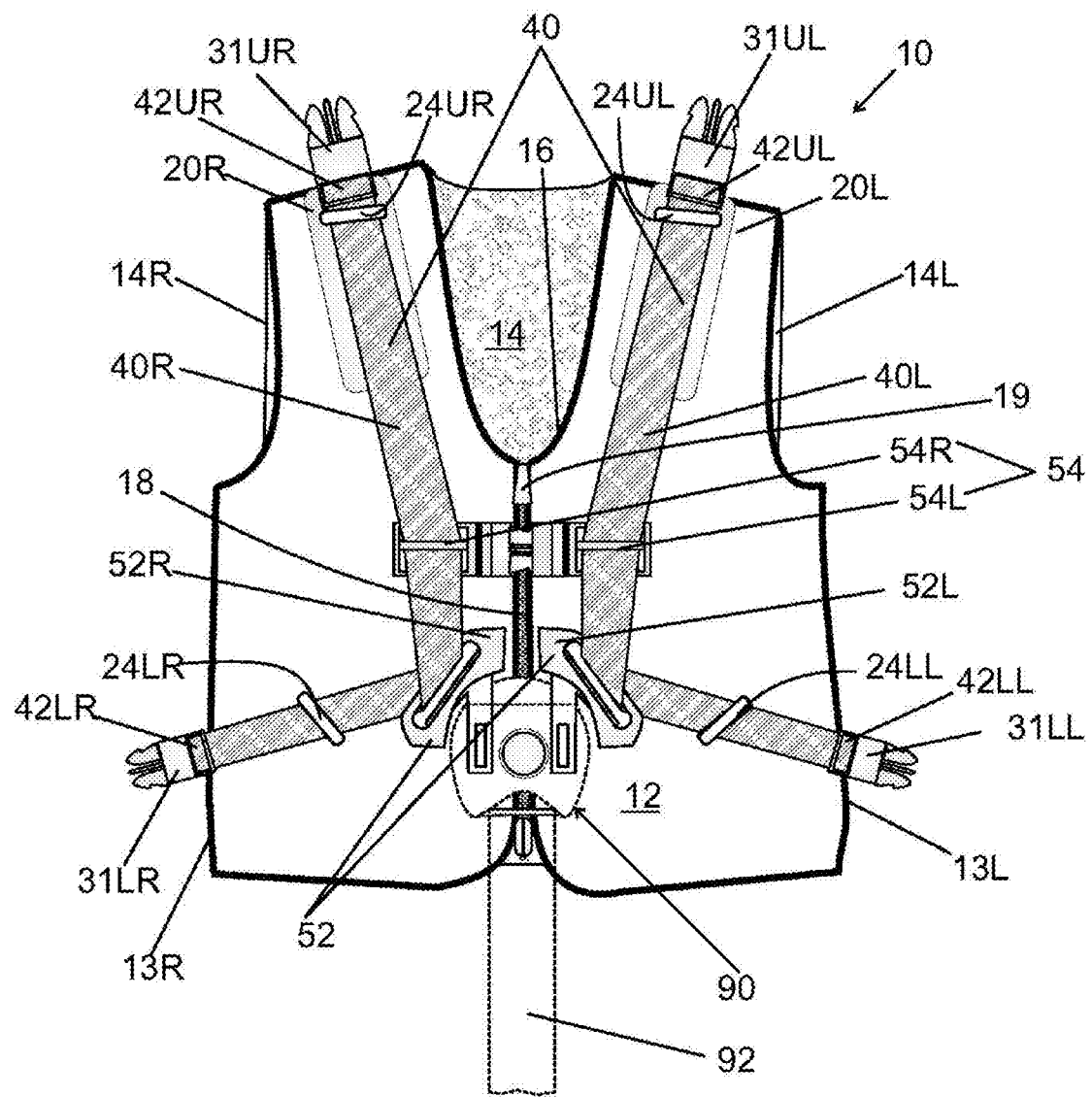
FIG. 2 is a frontal view of the invention shown in FIG. 1 illustrating the tension elements that include a chest tensioning element having a connected pair of opposing upper horizontal connectors, and a pair of lap tensioning elements that include a left angled connector and a right angled connector, which connect to a lap twin slotted buckle and an adjustable belt (shown with a dashed line)

As shown in FIG. 1 and FIG. 2, the jacket 14 has a relatively smooth frontal surface, therein precluding, entanglement of the clothing 12 with the sectional restraint elements 40 and the tension elements 52,54,31. The jacket 14 has a center-line closure mechanism that is a zipper 18 and a tassel 19. In one embodiment the zipper is an Under Armour™ magnetic zipper, which is capable of being zipped up with one hand. In the FIG. 1 the zipper is not fully raised to the neckline 16.

It is anticipated that in addition to a torso clothing element with a closeable center-line element like a zipper, the torso clothing element could be pulled over the child's head, for example like a T-shirt A T-shirt fabricated to have some stretch is desired, therein keeping it snug. A sweater would be similar. The clothing material has enough strength to support the fastening means, the straps and tensioning elements. The torso clothing element desirably can be washed or dry cleaned.

The sectional restraint elements 40 include a right sectional restraint element 40R and a left sectional restraint element 40L, differing mainly with respect to their right or left position relative to the medial center-line. The right sectional restraint element 40R includes a sectional length of restraint strap having an upper end 42UR that is terminated with an upper right adjustable tensioning element 31UR. When not tensioned by the tensioning elements 52,54 (they are not fastened), the right sectional restraint element 40R loosely drapes over a right shoulder extending frontally and looping downward and outward terminating with a lower right adjustable tensioning element 42LR that is proximate to a lower right side edge 13R of the clothing element 12. The left sectional restraint element 40L has a similar length of restraint strap, wherein an upper left end 42UL is terminated with an upper left adjustable tensioning element 31UL. The left sectional restraint element 40L loosely drapes over a left shoulder extending frontally and looping downward and outward terminating in an end 42LL with a lower left adjustable tensioning element 31LL proximate to a lower left side edge 13L of the clothing element 12.

In the illustrated embodiment the sleeveless jacket 14 is fitted with a fastening means that is a set of loops. The set of loops includes an upper right loop 24UR, a lower right loop 24LR, an upper left loop 24UL, and a lower left loop 24LL. The upper right loop 24UR loosely holds the upper right adjustable tensioning element 31UR by an upper end portion 42UR of the right sectional restraint strap 40R, and the lower right loop 24LR loosely holds the lower right adjustable tensioning element 31LR by a lower end portion 42 LR of the right sectional restraint strap 40R. On the left front side of the sleeveless jacket 14 the upper left loop 24UL similarly restrains the upper left adjustable tensioning element 31UL by an upper end portion 42UL of left sectional strap 40L, and the lower left loop 24LL loosely holds the lower left adjustable tensioning element 31LL by a lower end portion 42LL of left sectional strap 40L.

Typically, a child is dressed with the universal apparatus 10 which includes the torso clothing element 12 fitted with the fastening means 24UR,24UL,24LR,24LL loosely holding the adjustable sectional restraint elements 40 and the tensioning elements 54,52,31 when the two adjustable sectional restraint elements 40 not connected. The chest tensioning element 54 can be fastened, as it prevents the child from being able to pull off the universal apparatus 10 over their head or unzip the zipper 18. The zipper 18 should be raised to the neckline 16. Connecting the chest tensioning element 54 partially limits the movement of the right and left sectional restraint elements 40.

The child is now partially prepared for being quickly connected to, a car seat or stroller.

FIG. 2 is a frontal view of the invention shown in FIG. 1 illustrating how the tension elements 52,54,31 tension the section restraint straps 40. The tension elements include the adjustable tensioning elements 31, the chest tensioning element 54 having a connected pair of opposing upper horizontal connectors 54L,54R; and a pair of lap tensioning elements 52 that include a left angled connector 52L and a right angled connector 52R which connect to a lap twin slotted buckle 90 with an adjustable belt that is commonly found in child car seats. The third tension element includes the quick connecting tensioning elements. Each of the pair of the adjustable sectional restraint elements has two end portions, and each end portion has a quick connecting fastening element that can be fastened to a receiving tensioning element in the child car-seat, and when the quick connecting tensioning elements are connected to the receiving tensioning element the sectional restraint elements slightly tensioned, and limit movement of an individual wearing the torso clothing element.

Figure 3:
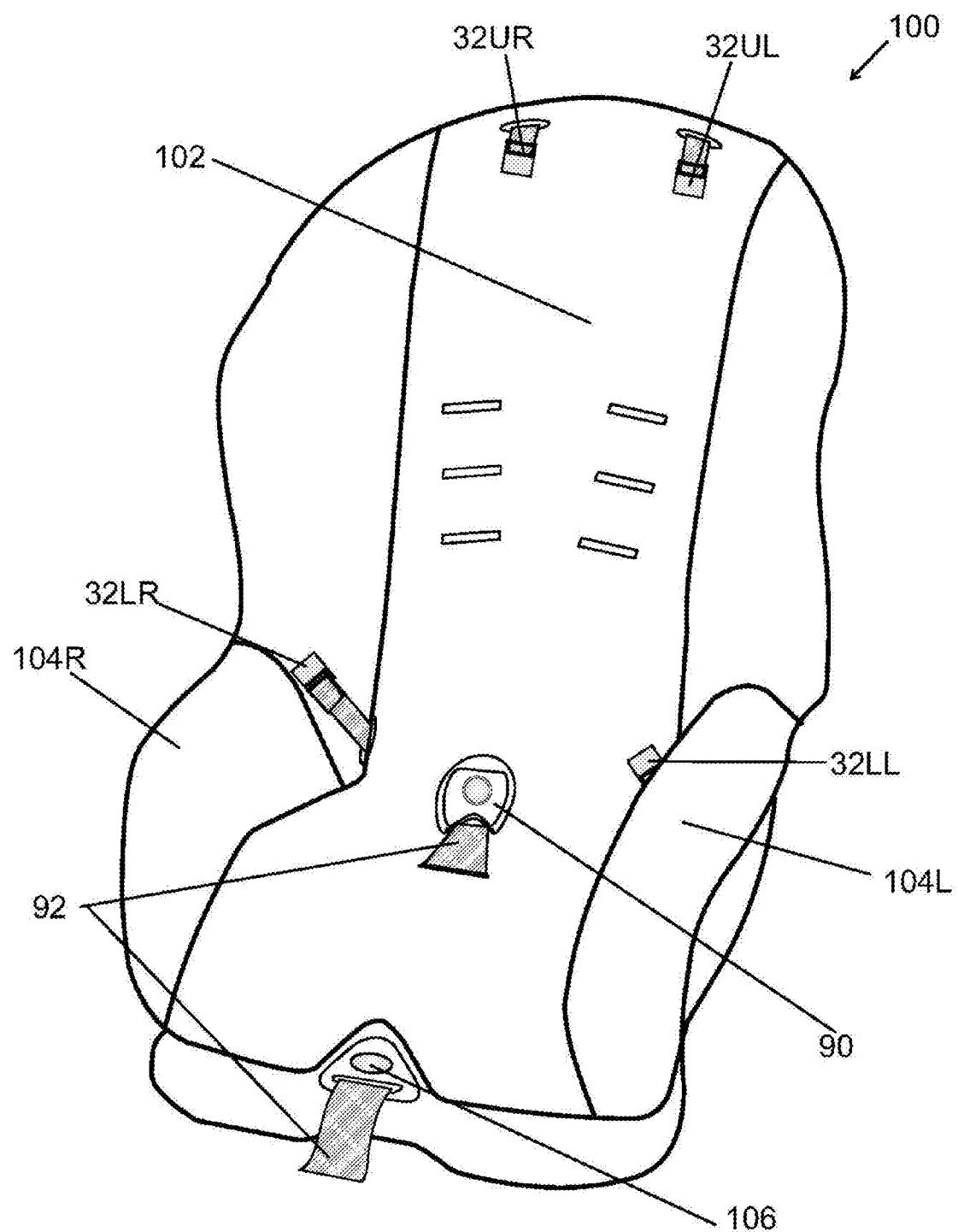
FIG. 3 is a perspective view of the invented car seat with four receiving tensioning elements, and a car seat's lap twin slotted buckle that can be loosened by feeding in the buckle's adjustable belt.
Figure 4:
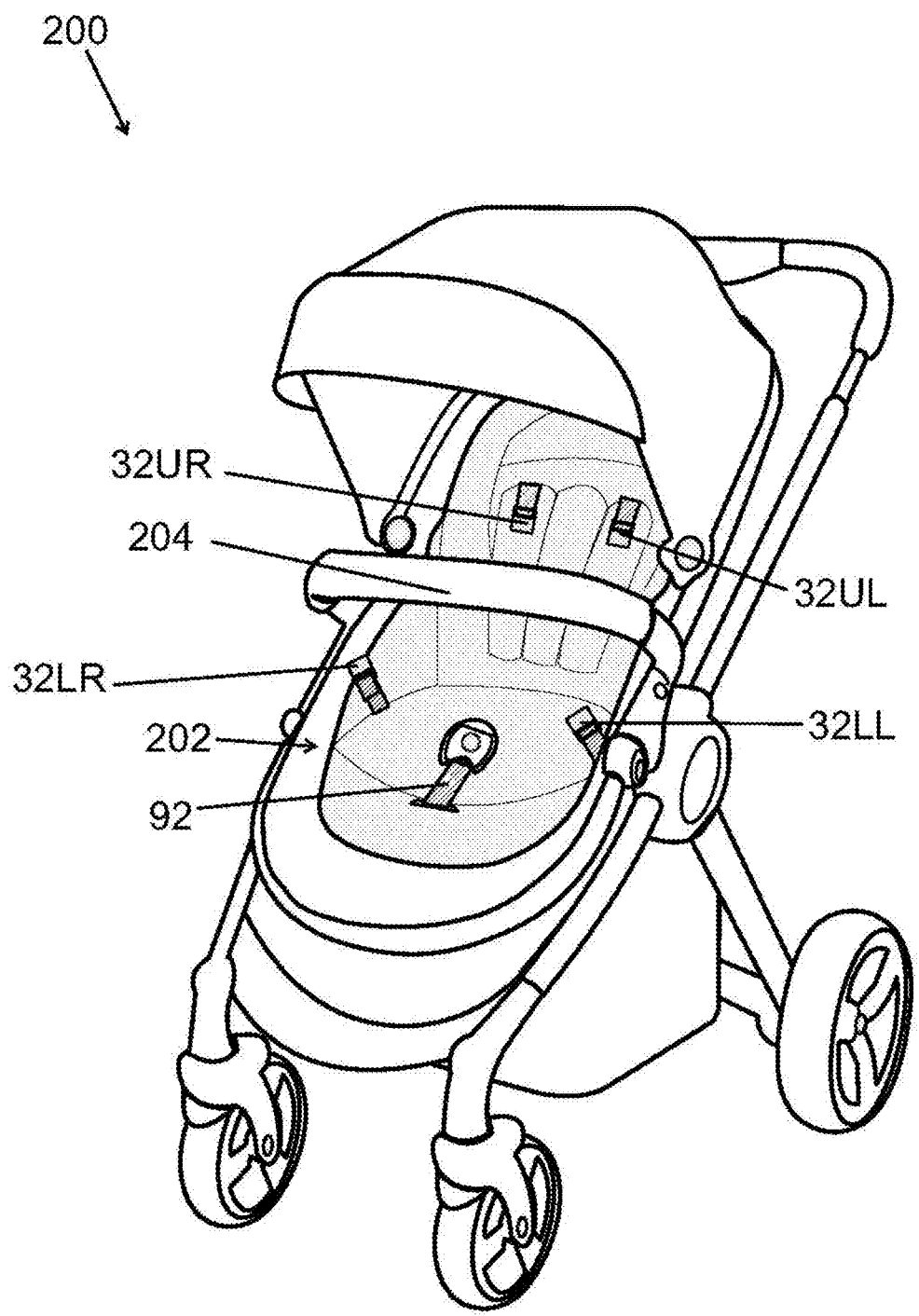
FIG. 4 is a perspective view of a stroller with four receiving tensioning elements, and a lap twin slotted buckle with an adjustable belt.

The lap twin slotted buckle 90 and belt can be adjusted before or after being connected. When connected, the left angled connector 52L and the right angled connector 52R tension both the left 40L and the right sectional restraint elements, pulling them medially toward the center-line and downward. As shown in FIG. 3 the lap twin slotted buckle 90 and adjustable belt 92 of the illustrated car seat 100 can also be loosened by feeding in the buckle's belt 92, which raises the buckle or tightened by pulling the buckle's belt 92 out which lowers the buckle.

As previously discussed the chest tensioning element 54 includes a left and right upper horizontal connectors 54L, 54R, which when connected also tensions both the left 40L and the right sectional restraint elements 40R,40L pulling them medially toward the center-line.

As shown in FIG. 3, the car seat 100 has an upper right receiving tensioning element 32UR for connecting the upper right adjustable tensioning element 31UR. The upper right receiving tensioning element 32UR projects from an overhead right rear slot in the back 102 of the child's car seat 100. An upper left receiving tensioning element 32UL for connecting the upper right adjustable tensioning element 31UR projects from an overhead left rear slot in the back 102 of the child's car seat. Projecting from a bottom right side 104R of the child's car seat 100 is a lower right receiving tensioning element 32LR, for connecting to the lower right adjustable tensioning element 31LR. Projecting from a bottom left side 104L of the child's car seat 100 is a lower left receiving tensioning element 32LL, for connecting to the lower left adjustable tensioning element 31LL. The illustrated car seat has a cam spring loaded rocker button 106 that must be pushed to lengthen (feed in) of the buckle's strap 92, whereas tension tightens the grip of the cam spring loaded rocker.

The embodied stroller 200 has a hinged padded guard arm 204, a flexible seat 202, the other common elements including a hood, a frame, a set of wheels, and a braking system. The stroller also has an upper right receiving tensioning element 32UR, an upper left receiving tensioning element 32UL, a lower right receiving tensioning element 32LR, and a lower right receiving tensioning element 32LL to which can be connected the adjustable tensioning elements 31UR, 31UL,31LR,31LL. The stroller also has a lap twin slotted buckle 90 and an adjustable belt 92, which at the discretion of the caregiver can be fastened.

The quick connect car-sea t restraint system permits a child to be dressed in a torso clothing element 12 having a fastening means that holds a pair of adjustable sectional restraint elements 40 and at least three tensioning elements 31,52,54 that are compatible with most car seats for children. One of the tensioning elements, the chest tensioning element which has an opposing upper horizontal pair of connectors 54 that, when connected, tends to pull the left and right sectional lenghts of restraint strap medially toward the centerline of the clothing element 12, preventing the child from taking off the clothing, and facilitating shortening the hook up to the car seat or stroller.

It is to be understood that the foregoing description and specific embodiments are merely illustrative of the best mode of the invention and the principles thereof, and that various modifications and additions may be made to the invention by those skilled in the art, without departing from the spirit and scope of this invention which is therefore understood, to be limited, only by the scope, of the appended claims.

Finally, any numerical parameters set forth in the specification and attached claims are approximations (for example, by using the term "about") that may vary depending upon the desired properties sought to be obtained by the present invention.

What is claimed is:

1. A quick connect restraint system for a child in a car, said system comprising:
    a child's car seat having a back with slots, that is nominally secured to a rear seat of the car, said child's car seat having receiving tensioning elements comprised of an upper right receiving tensioning element projecting through an overhead right rear slot, an upper left receiving tensioning element projecting through a left rear slot, a lower right receiving tensioning element projecting through a bottom right side of the child's car seat, a lower left receiving tensioning element projecting through a bottom left side of the child's car seat, and a lap twin slotted buckle having a length adjustable belt;
    a torso clothing element, that in use is worn by the child, comprised of a left adjustable sectional length of restraint strap, a right adjustable sectional length of restraint strap, and a fastening means for holding the right adjustable sectional length of restraint strap and the left adjustable sectional length of restraint strap onto the torso clothing element;
    a chest tensioning element comprised of an opposing upper horizontal pair of connectors that when connected pulls the left adjustable sectional length of restraint strap and the right adjustable sectional lengths of restraint strap medially toward a frontal centerline of the torso clothing element;
    a set of lap tensioning elements comprised of a left angled connector and a right angled connector which can connect to the lap twin slotted buckle, that when the left angled connector and the right angled connector are clipped into the lap twin slotted buckle, the left adjustable sectional length of restraint strap and the right adjustable sectional length of restraint strap are pulled downward and medially toward the frontal centerline of the torso clothing element;
    wherein the right adjustable sectional length of restraint strap has an upper right end portion with an upper right quick connecting fastening element that can be fastened to the upper right receiving tensioning element and a lower right end portion with a lower right quick connecting fastening element that can be fastened to the lower right receiving tensioning element, and the left adjustable sectional length of restraint strap has an upper left end portion with an upper left quick connecting fastening element that can be fastened to the upper left receiving tensioning element, and a lower left end portion with a lower left quick connecting fastening element that can be fastened to the lower left receiving tensioning element projecting from car-seat;
    wherein when all of the receiving tensioning elements are fastened, the adjustable sectional length of restraint straps are slightly tensioned, limiting movement of the child, and when the chest tensioning element and the set of lap tensioning elements are fastened, the child is secured, even in a case of an impact.

2. The system according to claim 1, wherein the torso clothing element is selected from the group consisting of a jacket, a vest, a shirt, a blouse, a sweater, a mesh covering, a jumper, a onesie, a T-shirt, and a jump suit.

3. The system according to claim 1, wherein the torso clothing element has a magnetic zipper, enabling closure using only one hand.

4. The system according to claim 1, wherein the fastening means is selected from the group consisting of a set of loops, snaps, pockets, and hook and loop materials, therein facilitating quick location and hooking up to the upper left, upper right, lower left and lower right receiving tensioning elements of the child's cart seat.

5. The system according to claim 1, wherein the fastening means is a set of loops comprised of an upper right loop, a lower right loop, an upper left loop, and a lower left loop, wherein each loop is loosely holding one of the quick adjustable tensioning elements to the torso clothing element.

6. The system according to claim 1 further comprises shoulder pads as a part of the torso clothing element, or as pads slideably mounted on the right and left adjustable sectional length of restraint straps.

7. A quick connect restraint system for a child in a stroller, said system comprising:
    a flexible seat of the stroller having receiving tensioning stroller elements comprised of an upper right receiving tensioning element, an upper left receiving tensioning stroller element, a lower right receiving tensioning stroller element, a lower right receiving tensioning stroller element, and a lap twin slotted stroller buckle connected to a length adjustable stroller belt;
    a torso clothing element, that in use is worn by the child, comprised of a left adjustable sectional length of restraint strap, a right adjustable sectional length of restraint strap, and a fastening means for holding the right adjustable sectional length of restraint strap and the left adjustable sectional length of restraint strap onto the torso clothing element;
    a chest tensioning element comprised of an opposing upper horizontal pair of connectors that when connected pull the left adjustable sectional length of restraint strap and right sectional length of restraint strap medially toward a frontal centerline of the torso clothing element;
    a set of lap tensioning elements that include a left angled connector and a right angled connector which can connect to the lap twin slotted stroller buckle, that when connected the connectors pull the left adjustable sectional length of restraint strap and right sectional length of restraint strap downward and medially toward the frontal centerline of the torso clothing element;
    wherein the right adjustable sectional length of restraint strap has an upper right end portion with an upper right quick connecting fastening element that can be fastened to the upper right receiving tensioning stroller element, a lower right end portion with a lower right quick connecting fastening element that can be fastened to the lower right receiving tensioning stroller element in the flexible seat of the stroller, and the left adjustable sectional length of restraint strap has an upper left end portion with an upper left quick connecting fastening element that can be fastened to the upper left receiving tensioning stroller element and a lower left end portion with a lower left quick connecting fastening element that can be fastened to the lower left receiving tensioning stroller element in the flexible seat of the stroller; and wherein movement of the child connected to the quick connect restraint system is constrained.

8. The system according to claim 7, wherein the torso clothing element is selected from the group consisting of a jacket, a vest, a shirt, a blouse, a sweater, a mesh covering, a jumper, a onesie, a T-shirt, and a jump suit.

9. The system according to claim 7, wherein the torso clothing element has a magnetic zipper, enabling closure using only one hand.

10. The system according to claim 7, wherein the fastening means is selected from the group consisting of a set of loops, snaps, pockets, hook and loop materials, therein facilitating quick location and hooking up to the upper left, upper right, lower left and lower right receiving tensioning stroller elements.

11. The system according to claim 7, wherein the fastening means is a set of loops comprised of an upper right loop, a lower right loop, an upper left loop, and a lower left loop, wherein each loop is loosely holding one of the quick adjustable tensioning elements to the torso clothing element.

12. The system according to claim 7 further comprises shoulder pads as a part of the torso clothing element, or as pads slideably mounted on the right and left adjustable sectional length of restraint straps.

13. A quick connect restraint system for a child in a car or in a stroller, said system comprising:

a child's car seat comprised of a back with slots, that is nominally secured to a rear seat of the car, said child's car seat having receiving tensioning elements comprised of an upper right receiving tensioning element projecting through an overhead right rear slot, an upper left receiving tensioning element projecting through a left rear slot, a lower right receiving tensioning element projecting through a bottom right side of the child's car seat, a lower left receiving tensioning element projecting through a bottom left side of the child's car seat, and a lap twin slotted buckle having a length adjustable belt;

a flexible seat of the stroller having receiving tensioning stroller elements comprised of an upper right receiving tensioning stroller element, an upper left receiving tensioning stroller element, a lower right receiving tensioning stroller element, a lower right receiving tensioning stroller element, and a lap twin slotted stroller buckle connected to a length adjustable stroller belt;

a torso clothing element, that in use is worn by the child, comprised of a left adjustable sectional length of restraint strap, a right adjustable sectional length of restraint strap, and a fastening means for holding the right adjustable sectional length of restraint strap and the left adjustable sectional length of restraint strap onto the torso clothing element;

a chest tensioning element comprised of an opposing upper horizontal pair of connectors that when connected pulls the left adjustable sectional length of restraint strap and the right sectional length of restraint strap medially toward a frontal centerline of the torso clothing element;

a set of lap tensioning elements comprised of a left angled connector and a right angled connector, which can connect to the lap twin slotted buckle of the child's car-seat or the lap twin slotted stroller buckle, that when connected the connectors pull the left adjustable sectional length of restraint strap and right sectional length of restraint strap downward and medially toward the frontal centerline of the torso clothing element;

wherein, in the child's car-seat, the right adjustable sectional length of restraint strap has an upper end portion with an upper right quick connecting fastening element that can be fastened to the upper right receiving tensioning element and a lower right end portion with a lower right quick connecting fastening element that can be fastened to the lower right receiving tensioning element, and the left adjustable sectional length of restraint strap has an upper left end portion with an upper left quick connecting fastening element that can be fastened to the upper left receiving tensioning element, and a lower left end portion with a lower left quick connecting fastening element that can be fastened to the lower left receiving tensioning element projecting from the back of the child's the car-seat; and wherein, in the stroller, the upper right quick connecting fastening element can be fastened to the upper right receiving tensioning stroller element, the lower right quick connecting fastening element can be fastened to the lower right receiving tensioning stroller element, the upper left quick connecting fastening element can be fastened to the upper left receiving tensioning element, and the lower left quick connecting fastening element can be fastened to the lower left receiving tensioning stroller element; and wherein upon connection to the receiving tensioning elements of the child's car-seat or the receiving tensioning stroller elements, the length of restraint straps are slightly tensioned, limiting movement of the child wearing the torso clothing element.

14. The system according to claim 13, wherein the torso clothing element is selected from the group consisting of a jacket, a vest, a shirt, a blouse, a sweater, a mesh covering, a jumper, a onesie, a T-shirt, and a jump suit.

15. The system according to claim 13, wherein the torso clothing element has a magnetic zipper, enabling closure using only one hand.

16. The system according to claim 13, wherein the fastening means is selected from the group consisting of a set of loops, snaps, pockets, hook and loop materials, therein facilitating quick location and hooking up to the upper left, upper right, lower left and lower right receiving tensioning stroller elements and to the upper left, upper right, lower left and lower right receiving tensioning elements on the child's car-seat.

17. The system according to claim 13, wherein the fastening means is a set of loops comprised of an upper right loop, a lower right loop, an upper left loop, and a lower left loop, wherein each loop is loosely holding one of the quick adjustable tensioning elements to the torso clothing element.

18. The system according to claim 13 further comprises shoulder pads as a part of the torso clothing element, or as pads slideably mounted on the right and left adjustable sectional length of restraint straps.

* * * * *